United States Patent
Tripuraneni et al.

(10) Patent No.: US 11,639,458 B2
(45) Date of Patent: May 2, 2023

(54) DRILLING MUD WITH ENHANCED ACTIVATED SLUDGE ADDITIVE

(71) Applicant: University of Louisiana at Lafayette, Lafayette, LA (US)

(72) Inventors: Gopi Chand Tripuraneni, Lafayette, LA (US); Mark Zappi, Lafayette, LA (US); Rafael Hernandez, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 640 days.

(21) Appl. No.: 16/674,043

(22) Filed: Nov. 5, 2019

(65) Prior Publication Data

US 2020/0071590 A1    Mar. 5, 2020

Related U.S. Application Data

(62) Division of application No. 16/032,386, filed on Jul. 11, 2018, now Pat. No. 10,501,674.

(60) Provisional application No. 62/531,035, filed on Jul. 11, 2017.

(51) Int. Cl.
| | |
|---|---|
| *C09K 8/035* | (2006.01) |
| *C09K 8/506* | (2006.01) |
| *C09K 8/32* | (2006.01) |
| *C09K 8/487* | (2006.01) |

(52) U.S. Cl.
CPC ............... *C09K 8/035* (2013.01); *C09K 8/32* (2013.01); *C09K 8/487* (2013.01); *C09K 8/506* (2013.01); *C09K 2208/34* (2013.01)

(58) Field of Classification Search
None
See application file for complete search history.

(56) References Cited

U.S. PATENT DOCUMENTS

| | | | |
|---|---|---|---|
| 10,501,674 B2* | 12/2019 | Tripuraneni | ........... C09K 8/487 |
| 2014/0128295 A1* | 5/2014 | Wagles | ................ C09K 8/5758 |
| | | | 507/111 |

* cited by examiner

*Primary Examiner* — Andrew Sue-Ako
(74) *Attorney, Agent, or Firm* — Kean Miller LLP; Russel O. Primeaux; Brian J. Servé

(57) ABSTRACT

In order to substantially reduce friction during drilling operations, specialized lubricants need to be added to drilling fluid recipes. In general, lubricants reduce friction by forming a thin film of liquid that separates the solid surfaces in contact. The primary objective of this research is to evaluate the performance of enhanced activated sludge (EAS) as a lubricant in drilling fluids. EAS is activated sludge rich in lipids. The mixed consortium of microorganism in waste water treatment facilities in grown under a high carbon/nitrogen ratio to trigger lipid accumulation.
Performance of EAS as drilling fluid additive was compared with commercial lubricants in terms of lubricity and flow properties. Lubricants were evaluated using water-based drilling mud at lubricant concentrations of 1.78, 3.11, 4.43, and 6.17 pounds per barrel (ppb). Experiments were carried out in a standard lubricity meter. The lubricity meter tests the ability of the lubricant in the drilling mud to reduce friction. Other parameters measured were plastic viscosity, gel strength, fluid loss, mud cake thickness, sand content, methylene blue test (MBT), alkalinity, and chlorides. These findings show that EAS will improve the properties of water-based drilling mud.

7 Claims, 8 Drawing Sheets

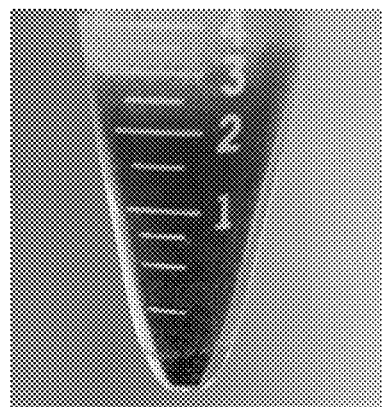
Sludge (fee) settling over the bentonite sand
FIGURE 7
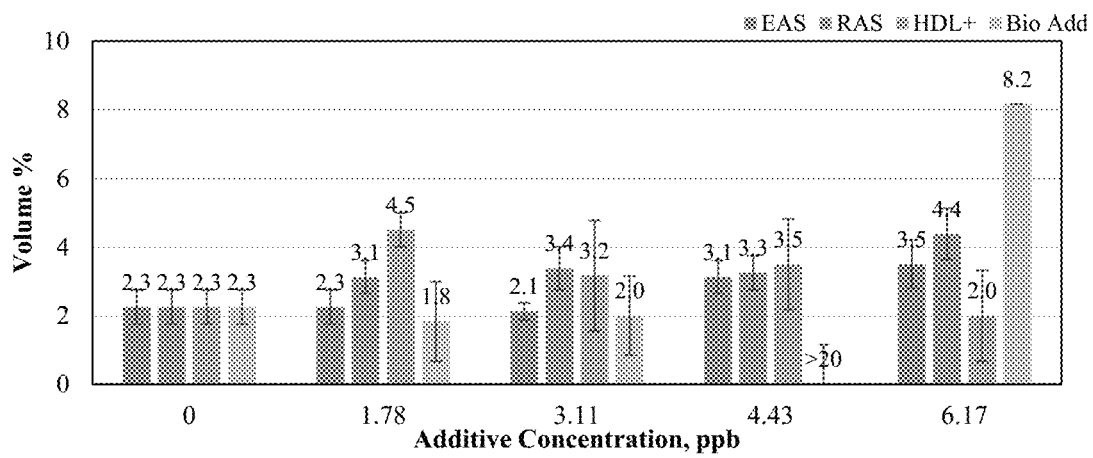
FIGURE 8
TABLE 1
| 1. Component | 2. Concentration (g/L water) |
|---|---|
| 3. Glucose | 4. 40 |
| 5. $(NH_4)_2SO_4$ | 6. 1.258 |
| 7. Gelatin | 8. 0.15 |
| 9. Starch | 10. 0.07 |
| 11. Yeast Extract | 12. 0.07 |
| 13. Casamino acids | 14. 0.01 |
| 15. $NaH_2PO_4$ | 16. 1.5 |
| 17. $K_2HPO_4$ | 18. 1 |
| 19. Trace mineral solution | 20. 5-mL/L |
FIGURE 9

TABLE 2

| Additive | | EAS | RAS | HDL+ | Bio Add |
|---|---|---|---|---|---|
| Concentration | 1.71 ppb | 10.96 | 10.95 | 10.43 | 10.65 |
|  | 3.11 ppb | 10.95 | 10.95 | 9.76 | 10.13 |
|  | 4.43 ppb | 10.95 | 10.96 | 9.42 | 9.68 |
|  | 6.17 ppb | 10.95 | 11.00 | 9.13 | 9.47 |

FIGURE 10

TABLE 3

| Properties | Units | 1 | 2 | 3 |
|---|---|---|---|---|
| Mud Weight | lbs./gal | 10.95 | 10.95 | 10.95 |
| Plastic Viscosity | cp | 20.00 | 19.00 | 19.00 |
| Yield Strength | lbs./100 ft$^2$ | 11.00 | 18.00 | 10.00 |
| HPHT Fluid Loss | ml | 34.40 | 34.00 | 50.00 |
| Filter Cake | per 32" | 7.00 | 7.00 | 7.00 |
| API fluid loss, ml | 30 min | 15 | 14 | 13.6 |
| Sand Content | vol % | 2.00 | 2.00 | 3.00 |
| Chlorides | ppm | 128.57 | 111.11 | 120.00 |
| Alkalinity: 0.02N H$_2$SO$_4$ | ml | 0.21 | 0.20 | 0.26 |
| MBT | ml | 6.00 | 6.00 | 7.50 |
| Lubricity Reading | Mud | 47.40 | 46.50 | 42.50 |
|  | DI water | 34.40 | 34.60 | 33.70 |
|  | Cof | 0.47 | 0.46 | 0.43 |

FIGURE 11

TABLE 4

| Properties | Units | 1 | 2 | 3 | 4 | 1 | 2 | 3 | 4 |
|---|---|---|---|---|---|---|---|---|---|
| Mud Weight | lbs./gal | 10.95 | 10.95 | 10.95 | 11.00 | 10.95 | 10.95 | 10.95 | 10.95 |
| Plastic Viscosity | cp | 13.00 | 13.00 | 14.70 | 15.50 | 16.40 | 20.50 | 19.90 | 20.70 |
| Yield Strength | lbs./100 ft$^2$ | 6.00 | 6.00 | 6.30 | 8.70 | 16.80 | 12.60 | 7.00 | 16.20 |
| HPHT Fluid Loss | ml | 42.40 | 45.20 | 41.20 | 48.40 | 44.00 | 49.20 | 36.80 | 42.00 |
| Filter Cake | per 32" | 5.00 | 6.00 | 8.00 | 5.00 | 5.00 | 5.00 | 6.00 | 6.00 |
| API fluid loss, ml | 30 min | 15.2 | 14.2 | 15.2 | 15.4 | 15.2 | 15.8 | 14.8 | 15.2 |
| Sand Content | vol % | 2.00 | 2.00 | 3.00 | 2.00 | 2.00 | 2.00 | 2.00 | 2.50 |
| Chlorides | ppm | 120.0 | 100.0 | 120.0 | 120.0 | 120.0 | 120.0 | 120.0 | 100.00 |
| Alkalinity: 0.02N H$_2$SO$_4$ | ml | 0.22 | 0.22 | 0.18 | 0.20 | 0.20 | 0.22 | 0.18 | 0.22 |
| MBT | ml | 7.50 | 7.50 | 7.50 | 7.00 | 7.50 | 7.50 | 8.00 | 7.00 |
| Lubricity Reading | Mud | 30.80 | 31.20 | 31.00 | 30.80 | 27.60 | 29.20 | 28.10 | 28.00 |
| | DI Water | 35.70 | 35.70 | 33.80 | 35.40 | 35.70 | 35.70 | 33.80 | 35.40 |
| | Cof | 0.29 | 0.30 | 0.31 | 0.30 | 0.26 | 0.28 | 0.28 | 0.27 |
| Torque Reduction | % | 32.26 | 31.38 | 31.82 | 32.26 | 39.30 | 35.78 | 38.20 | 38.42 |

FIGURE 12

TABLE 5

| Properties | Units | 1 | 2 | 3 | 4 | 1 | 2 | 3 | 4 |
|---|---|---|---|---|---|---|---|---|---|
| Mud Weight | lbs./gal | 10.95 | 10.95 | 11.00 | 11.00 | 10.95 | 10.95 | 11.00 | 11.05 |
| Plastic Viscosity | cp | 21.50 | 21.90 | 22.00 | 26.30 | 26.00 | 31.90 | 20.30 | 28.00 |
| Yield Strength | lbs./100 ft$^2$ | 17.10 | 12.40 | 10.10 | 22.00 | 23.70 | 22.50 | 14.50 | 12.50 |
| HPHT Fluid Loss | ml | 40.40 | 39.20 | 34.80 | 38.00 | 33.60 | 36.00 | 32.80 | 35.20 |
| Filter Cake | per 32" | 6.00 | 7.00 | 7.00 | 8.00 | 7.00 | 8.00 | 9.00 | 8.00 |
| API fluid loss, ml | 30 min | 13.6 | 14.4 | 12.8 | 13.2 | 12.6 | 13.2 | 13 | 13.2 |
| Sand Content | vol % | 2.50 | 3.50 | 3.50 | 3.00 | 3.00 | 3.50 | 3.00 | 4.50 |
| Chlorides | ppm | 120.00 | 120.0 | 100.0 | 120.0 | 120.0 | 120.0 | 100.00 | 100.00 |
| Alkalinity: 0.02N H$_2$SO$_4$ | ml | 0.20 | 0.24 | 0.22 | 0.20 | 0.26 | 0.24 | 0.22 | 0.26 |
| MBT | ml | 7.50 | 8.50 | 8.50 | 8.50 | 7.00 | 7.50 | 9.00 | 7.50 |
| Lubricity Reading | Mud | 30.90 | 29.10 | 25.90 | 25.80 | 25.90 | 25.20 | 23.40 | 24.90 |
| | DI Water | 35.90 | 35.90 | 33.80 | 35.40 | 35.50 | 35.50 | 33.80 | 35.40 |
| | Cof | 0.29 | 0.28 | 0.26 | 0.25 | 0.25 | 0.24 | 0.24 | 0.24 |
| Torque Reduction | % | 32.04 | 36.00 | 43.04 | 43.26 | 43.04 | 44.57 | 48.53 | 45.23 |

FIGURE 13

TABLE 6

| Properties | Units | 1 | 2 | 3 | 4 | 1 | 2 | 3 | 4 |
|---|---|---|---|---|---|---|---|---|---|
| Mud Weight | lbs./gal | 10.95 | 10.95 | 10.95 | 10.95 | 10.95 | 10.95 | 10.95 | 10.95 |
| Plastic Viscosity | cp | 19.70 | 18.70 | 20.00 | 16.20 | 29.80 | 30.10 | 25.00 | 29.60 |
| Yield Strength | lbs./100 ft$^2$ | 9.90 | 9.50 | 15.40 | 5.10 | 25.70 | 24.70 | 24.00 | 14.70 |
| HPHT Fluid Loss | ml | 50.00 | 42.40 | 38.00 | 56.00 | 38.00 | 42.00 | 36.00 | 56.00 |
| Filter Cake | per 32" | 7.00 | 6.00 | 8.00 | 8.00 | 8.00 | 7.00 | 11.00 | 8.00 |
| API fluid loss, 30 min | ml | 15.6 | 13.6 | 17 | 16 | 12.8 | 13.2 | 16.4 | 15.6 |
| Sand Content | vol % | 2.50 | 3.50 | 3.50 | 3.00 | 3.50 | 3.50 | 2.50 | 4.00 |
| Chlorides | ppm | 120.00 | 100.0 | 100.0 | 100.0 | 120.00 | 120.00 | 120.00 | 100.00 |
| Alkalinity: 0.02N H2SO4 | ml | 0.30 | 0.32 | 0.24 | 0.24 | 0.32 | 0.28 | 0.22 | 0.20 |
| MBT | ml | 7.50 | 7.50 | 8.50 | 8.00 | 7.00 | 7.50 | 8.50 | 8.00 |
| Lubricity Reading | Mud | 33.80 | 33.90 | 30.90 | 32.30 | 28.50 | 29.80 | 27.60 | 30.90 |
| | DI Water | 35.60 | 35.60 | 34.40 | 35.00 | 35.60 | 35.60 | 34.40 | 35.00 |
| | Cof | 0.32 | 0.32 | 0.31 | 0.31 | 0.27 | 0.28 | 0.27 | 0.30 |
| Torque Reduction | % | 25.66 | 25.44 | 32.04 | 28.96 | 37.32 | 34.46 | 39.30 | 32.04 |

FIGURE 14

TABLE 7

| Properties | Units | 1 | 2 | 3 | 4 | 1 | 2 | 3 | 4 |
|---|---|---|---|---|---|---|---|---|---|
| Mud Weight | lbs./gal | 10.95 | 10.95 | 10.95 | 11.00 | 11.00 | 11.00 | 11.00 | 11.00 |
| Plastic Viscosity | cp | 26.10 | 23.70 | 36.00 | 34.30 | 33.30 | 35.90 | 24.60 | 29.60 |
| Yield Strength | lbs./100 ft$^2$ | 20.30 | 27.10 | 45.00 | 32.70 | 29.60 | 33.50 | 19.70 | 14.70 |
| HPHT Fluid Loss | ml | 42.80 | 44.60 | 40.00 | 56.00 | 35.60 | 32.80 | 33.60 | 56.80 |
| Filter Cake | per 32" | 7.00 | 8.00 | 8.00 | 8.00 | 8.00 | 7.00 | 8.00 | 8.00 |
| API fluid loss, 30 min | ml | 13.6 | 14.4 | 13.6 | 16 | 12.6 | 13.2 | 15.8 | 15.8 |
| Sand Content | vol % | 3.50 | 3.50 | 2.50 | 3.50 | 4.00 | 3.50 | 5.00 | 5.00 |
| Chlorides | ppm | 100.0 | 120.00 | 120.00 | 120.0 | 100.0 | 120.0 | 120.0 | 120.00 |
| Alkalinity: 0.02N H2SO4 | ml | 0.20 | 0.22 | 0.26 | 0.22 | 0.18 | 0.18 | 0.24 | 0.22 |
| MBT | ml | 6.50 | 6.00 | 9.00 | 9.50 | 6.50 | 6.50 | 9.50 | 9.50 |
| Lubricity Reading | Mud | 30.10 | 30.20 | 29.00 | 28.40 | 29.90 | 27.90 | 28.80 | 28.40 |
| | DI Water | 35.50 | 35.50 | 34.40 | 35.00 | 33.30 | 33.30 | 35.00 | 34.40 |
| | Cof | 0.29 | 0.29 | 0.29 | 0.28 | 0.31 | 0.28 | 0.28 | 0.28 |
| Torque Reduction | % | 34.24 | 38.64 | 36.66 | 37.54 | 34.24 | 38.64 | 36.66 | 37.54 |

FIGURE 15

TABLE 8

| Properties | Units | 1 | 2 | 3 | 1 | 2 | 3 |
|---|---|---|---|---|---|---|---|
| Mud Weight | lbs./gal | 10.30 | 10.20 | 10.80 | 9.85 | 9.65 | 9.79 |
| Plastic Viscosity | cp | 18.70 | 20.40 | 20.20 | 21.00 | 21.40 | 17.70 |
| Yield Strength | lbs./100 ft$^2$ | 4.40 | 8.70 | 5.40 | 12.70 | 9.10 | 21.90 |
| HPHT Fluid Loss | ml | 72.00 | 64.00 | 62.00 | 68.00 | 68.00 | 64.00 |
| Filter Cake | per 32" | 7.00 | 7.00 | 7.00 | 8.00 | 7.00 | 7.00 |
| API fluid loss, ml | 30 min | 22.6 | 14.7 | 17 | 26.1 | 16.6 | 17.2 |
| Sand Content | vol % | 4.00 | 4.50 | 5.00 | 2.50 | 2.00 | 5.00 |
| Chlorides | ppm | 120.00 | 120.0 | 140.00 | 120.0 | 120.0 | 140.00 |
| Alkalinity: 0.02N H$_2$SO$_4$ | ml | 0.32 | 0.32 | 0.22 | 0.34 | 0.36 | 0.26 |
| MBT | ml | 7.50 | 7.50 | 9.00 | 5.00 | 7.50 | 9.00 |
| Lubricity Reading | Mud | 30.00 | 27.80 | 24.60 | 24.30 | 23.80 | 21.40 |
| | DI Water | 35.50 | 33.90 | 33.70 | 35.50 | 33.90 | 33.70 |
| | Cof | 0.29 | 0.28 | 0.25 | 0.23 | 0.24 | 0.22 |
| Torque Reduction | % | 34.02 | 38.86 | 45.89 | 46.55 | 47.65 | 52.93 |

FIGURE 16

TABLE 9

| Properties | Units | 1 | 2 | 3 | 1 | 2 | 3 |
|---|---|---|---|---|---|---|---|
| Mud Weight | lbs./gal | 9.44 | 9.28 | 9.55 | 9.30 | 9.12 | 8.98 |
| Plastic Viscosity | cp | 18.00 | 19.60 | 17.90 | 17.00 | 16.00 | 15.20 |
| Yield Strength | lbs./100 ft$^2$ | 7.70 | 4.50 | 17.60 | 24.60 | 34.30 | 27.90 |
| HPHT Fluid Loss | ml | 74.00 | 66.00 | 66.00 | 78.00 | 75.40 | 64.00 |
| Filter Cake | per 32" | 8.00 | 7.00 | 7.00 | 8.00 | 8.00 | 7.00 |
| API fluid loss, ml | 30 min | 30.2 | 18.1 | 18.9 | 32.5 | 20.1 | 20.8 |
| Sand Content | vol % | 2.00 | 4.00 | 4.50 | 1.00 | 1.50 | 3.50 |
| Chlorides | ppm | 100.00 | 120.0 0 | 140.00 | 100.0 0 | 120.0 0 | 140.00 |
| Alkalinity: 0.02N H$_2$SO$_4$ | ml | 0.40 | 0.40 | 0.28 | 0.40 | 0.40 | 0.28 |
| MBT | ml | 5.00 | 7.00 | 10.50 | 6.00 | 8.00 | 11.50 |
| Lubricity Reading | Mud | 20.10 | 18.30 | 16.70 | 14.80 | 17.10 | 15.10 |
| | DI Water | 35.50 | 35.00 | 33.70 | 35.50 | 35.00 | 33.70 |
| | Cof | 0.19 | 0.18 | 0.17 | 0.14 | 0.17 | 0.15 |
| Torque Reduction | % | 55.79 | 59.75 | 63.27 | 67.45 | 62.39 | 66.79 |

FIGURE 17

TABLE 10

| Properties | Units | 1 | 2 | 3 | 1 | 2 | 3 |
|---|---|---|---|---|---|---|---|
| Mud Weight | lbs./gal | 10.65 | 10.60 | 10.70 | 10.20 | 10.30 | 9.90 |
| Plastic Viscosity | cp | 20.90 | 17.30 | 29.20 | 24.40 | 20.70 | 32.80 |
| Yield Strength | lbs./100 ft² | 23.40 | 22.70 | 36.50 | 32.40 | 30.20 | 40.40 |
| HPHT Fluid Loss | ml | 46.80 | 42.00 | 42.00 | 38.40 | 38.00 | 38.00 |
| Filter Cake | per 32" | 5.00 | 7.00 | 7.00 | 5.00 | 7.00 | 7.00 |
| API fluid loss, ml | 30 min | 13.8 | 13.4 | 13.8 | 15.2 | 13 | 13.5 |
| Sand Content | vol % | 2.00 | 1.50 | 2.00 | 2.00 | 1.50 | 2.50 |
| Chlorides | ppm | 0.14 | 0.14 | 0.12 | 0.12 | 0.12 | 0.14 |
| Alkalinity: 0.02N H₂SO₄ | ml | 0.18 | 0.20 | 0.18 | 0.18 | 0.22 | 0.18 |
| MBT | ml | 8.50 | 8.50 | 9.00 | 8.00 | 7.50 | 9.50 |
| Lubricity Reading | Mud | 30.60 | 27.60 | 25.20 | 21.60 | 17.80 | 18.40 |
|  | DI Water | 35.50 | 33.80 | 34.20 | 35.50 | 33.80 | 34.20 |
|  | Cof | 0.29 | 0.28 | 0.25 | 0.21 | 0.18 | 0.18 |
| Torque Reduction | % | 32.70 | 39.30 | 44.57 | 52.49 | 60.85 | 59.53 |

FIGURE 18

TABLE 11

| Properties | Units | 1 | 2 | 3 | 1 | 2 | 3 |
|---|---|---|---|---|---|---|---|
| Mud Weight | lbs./gal | 9.79 | 9.70 | 9.55 | 9.10 | 9.95 | 9.35 |
| Plastic Viscosity | cp | 27.00 | 20.50 | 28.20 | 21.00 | 18.90 | 31.40 |
| Yield Strength | lbs./100 ft² | 47.60 | 31.40 | 41.50 | 40.80 | 31.40 | 51.40 |
| HPHT Fluid Loss | ml | 39.00 | 40.00 | 38.00 | 37.20 | 36.00 | 36.00 |
| Filter Cake | per 32" | 5.00 | 7.00 | 7.00 | 7.00 | 7.00 | 7.00 |
| API fluid loss, ml | 30 min | 13.6 | 12.8 | 13.7 | 14.6 | 15 | 13 |
| Sand Content | vol % | 2.50 | 2.50 | 2.00 | 7.50 | 10.00 | 7.00 |
| Chlorides | ppm | 140.00 | 140.00 | 120.00 | 120.00 | 160.00 | 140.00 |
| Alkalinity: 0.02N H₂SO₄ | ml | 0.18 | 0.18 | 0.18 | 0.12 | 0.26 | 0.18 |
| MBT | ml | 11.00 | 9.50 | 11.00 | 6.00 | 8.50 | 12.00 |
| Lubricity Reading | Mud | 15.60 | 14.10 | 17.80 | 11.70 | 10.50 | 13.90 |
|  | DI Water | 35.50 | 33.80 | 34.20 | 35.50 | 33.80 | 34.20 |
|  | Cof | 0.15 | 0.14 | 0.18 | 0.11 | 0.11 | 0.14 |
| Torque Reduction | % | 65.69 | 68.99 | 60.85 | 74.27 | 76.91 | 69.43 |

FIGURE 19

DRILLING MUD WITH ENHANCED ACTIVATED SLUDGE ADDITIVE

CROSS REFERENCE TO RELATED APPLICATION

This application is a divisional of U.S. non-provisional application Ser. No. 16/032,386 filed on Jul. 11, 2018, which claims the benefit of U.S. Provisional Patent Application No. 62/531,035 filed on Jul. 11, 2017. The disclosure of the referenced application is hereby incorporated herein in its entirety by reference.

STATEMENT REGARDING FEDERALLY SPONSORED RESEARCH OR DEVELOPMENT

Not applicable.

REFERENCE TO A "SEQUENCE LISTING", A TABLE, OR COMPUTER PROGRAM

Table 1 provides a description of the synthetic media use for fermentation to produce a high lipid content sludge.

Table 2 presents mud densities of EAS and RAS mixed mud.

Table 3 presents test results of base mud without additives.

Table 4 presents test results with EAS at 1.78 ppb and 3.11 ppb concentrations respectively.

Table 5 presents test results of mud with EAS at 4.43 ppb and 6.17 ppb concentration respectively.

Table 6 presents test results with RAS at 1.78 ppb and 3.11 ppb concentration respectively.

Table 7 presents test results of mud with RAS at 4.43 ppb and 6.17 ppb concentration respectively.

Table 8 presents test results of mud with HDL+ at 1.78 ppb and 3.11 ppb concentrations respectively.

Table 9 presents test results of mud with HDL+ at 4.43 ppb and 6.17 ppb concentrations respectively.

Table 10 presents test results of mud with Bio Add at 1.78 ppb and 3.11 ppb concentrations respectively.

Table 11 presents test results of mud with Bio Add at 4.43 ppb and 6.17 ppb concentrations respectively.

DESCRIPTION OF THE DRAWINGS

FIG. 7 depicts the relative layers of free settling of sludge over the settled sand.

FIG. 8 provides a comparison of the relationship between additive concentration and sand content as determined by API practice 13B.

FIG. 9 depicts Table 1 which provides a description of the synthetic media use for fermentation to produce a high lipid content sludge.

FIG. 10 depicts Table 2 which presents mud densities of EAS and RAS mixed mud.

FIG. 11 depicts Table 3 which presents test results of base mud without additives.

FIG. 12 depicts Table 4 which presents test results with EAS at 1.78 ppb and 3.11 ppb concentrations respectively.

FIG. 13 depicts Table 5 which presents test results of mud with EAS at 4.43 ppb and 6.17 ppb concentration respectively.

FIG. 14 depicts Table 6 which presents test results with RAS at 1.78 ppb and 3.11 ppb concentration respectively.

FIG. 15 depicts Table 7 which presents test results of mud with RAS at 4.43 ppb and 6.17 ppb concentration respectively.

FIG. 16 depicts Table 8 which presents test results of mud with HDL+ at 1.78 ppb and 3.11 ppb concentrations respectively.

FIG. 17 depicts Table 9 which presents test results of mud with HDL+ at 4.43 ppb and 6.17 ppb concentrations respectively.

FIG. 18 depicts Table 10 which presents test results of mud with Bio Add at 1.78 ppb and 3.11 ppb concentrations respectively.

FIG. 19 depicts Table 11 which presents test results of mud with Bio Add at 4.43 ppb and 6.17 ppb concentrations respectively.

FIELD OF THE INVENTION

Figure 1:
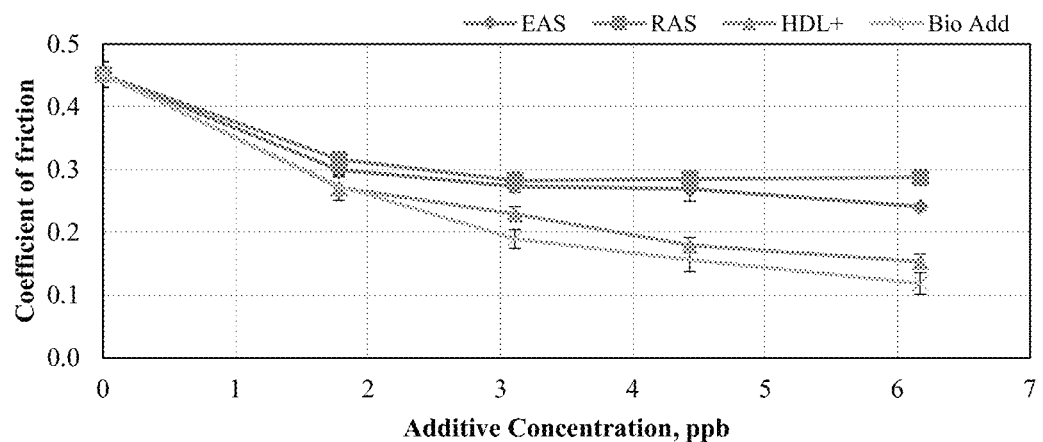
FIG. 1 provides a comparison of the relationship between additive concentration and the resultant coefficient of friction.

The present invention relates to the general field of well drilling, especially as it relates to exploration and development of petroleum sources of energy. The invention relates generally to a drilling mud composition and method to facilitate well drilling by reducing friction between drilling mud and other solid surfaces found downhole. In particular, the invention relates to the use of enhanced and raw activated sludge as a drilling mud ingredient.

BACKGROUND OF THE INVENTION

Drilling mud selection, type, and composition used are a very important part of a drilling process. The drilling mud has been called the "lifeblood" of the drilling operation since it is responsible for the removal of cuttings, lubricity, bore stability, and also prevention of inflow between borehole and formations (Ekunsanmi, 2012). Torque reduction by drilling fluids in directional drilling and extended reach wells is a subject of special importance. Friction and high torque and drag, resulting from drill string and wellbore casing interaction could cause a stuck pipe and even a loss of the well. Even though oil-based muds and synthetic-based muds performance has been proved to provide high temperature stability and produce lower friction and torque values (Sönmez, Veran Kok, & Ozel, 2013), these muds are severely limited due to high costs and environmental regulations (Melton et al., 2000). For this reason, water-based muds are preferred, even though additives are necessary to reach desired levels of performance. These muds are considered environmentally friendly, low cost and not toxic compared to oil-based muds.

To decrease the torque caused by high frictional forces in drilling, lubricants are used in water-based muds. Lubricants can be divided into two types: solid lubricants and liquid lubricants. Solid lubricants work like ball bearings and do not bond to contact surfaces. Solid lubricants performance is independent from the drilling fluid type as there is no interaction between the drilling fluid and the solid lubricant. However, solid lubricants may cause plugging problems. Liquid lubricants form a thick film between surfaces, masking surface roughness and withstands high compressional forces (Sönmez et al., 2013). As liquid lubricants interact with other surface active materials, their performance depends on their concentrations. Diesel oil and crude oil of varying densities have been applied by the industry, but they do not perform well when compared to established commercial lubricants (which are specially made for lowering friction). Liquid lubricants include triglycerides, vegetable based oil, glyceride and polypropylene based lubricants, and fossil fuel blends with chemicals. Liquid lubricants have relatively lower density compared to other compounds in the drilling and oil-water emulsion causing foam, which needs density controlling additives. Furthermore, commercial lubricants could cause toxicity to marine life and biodegradability problems (Melton et al., 2000). Along with lubricants, paraffins, esters aldehydes, acids, and other polymeric compounds are being used as additives for volume of filtration loss in milliliters of water from drilling mud through the mud cake formed at certain conditions (fluid loss), viscosity, gel strength as well as emulsifying agents and corrosion inhibitors. Desired properties of these additives include non-toxicity (or low-toxicity), biodegradability, avoidance of an oily slick on water.

Research has evolved on the use of microorganisms as drilling mud additives. Unextracted Lipids inside microorganisms were found to reduce torque. Experiments were conducted by Dillon, Ngantung, and Echaniz (2014) using oleaginous microorganisms having more than 45-85% of lipids (cell dry weight). Results showed a 65% torque reduction. The reduction is directly proportional to the concentration of lipids inside the cells (microorganisms). The impact of cell addition on torque was caused by lipids but also cellular material. Cell lysis usually occurs to microorganisms due to the extreme pressures at the drill bit. Lipids are now free to lubricate the drill bit, forming a thin layer between the surfaces. These investigators demonstrated that lysing microbes prior to addition to the drilling mud performs better in terms of lubricity compared to adding the whole cells. Previous studies demonstrated that activated sludge generated by wastewater treatment facilities could reduce the friction, fluid loss and impart desired rheological properties to the mud (Parker, 1966). The dried sludge from a treatment facility primarily reduced friction and fluid loss.

Waste activated sludge is generated as a by-product of microbes consuming the organic matter present in sewage water during treatment. It is basically the excess cell growth. Microorganisms with the metabolic capability to accumulate more than 20% of their weight as lipids are considered oleaginous. This class of microbes are capable of accumulating lipids up to 80% cell dry weight (CDW) (Dillon et al., 2014). Sewage sludge generated in wastewater facilities contains 5-10% CDW of extractable lipids (Mondala et al., 2008) (Fortela, 2016). Previous studies have demonstrated that waste activated sludge is capable of accumulating lipids, similar to oleaginous microorganisms, under environmental stress. Enhanced Activated Sludge contains 5-80% CDW of extractable liquids. A common stress condition is a high carbon:nitrogen ratio. Once nitrogen is depleted, microorganisms transform the carbon source to lipid globules for energy storage. Mixed cultures are most cost effective than pure cultures since sterilization is unnecessary (Mondala, 2010). Additionally, millions of tons of waste activated sludge are generated annually. Thus, adding value of this waste by transforming it into a drilling mud additive could not only result in a new renewable and environmentally friendly product for oil exploration, but also contribute to the cost effective management of waste activated sludge. Some wastewater treatment facilities are spending a significant fraction of their budgets managing this wastewater treatment by-product. Enhanced activated sludge (EAS) is waste activated sludge cultured at stressed conditions to trigger lipid accumulation. Glucose as the carbon source in the preparation of EAS results in the synthesis of triglycerides. Approximately 80% of the EAS are observed to be oleaginous microorganisms (Mondala et al., 2012).

DETAILED DESCRIPTION OF THE INVENTION

Examples are provided herein utilizing EAS, raw activated sludge (RAS) and two commercial lubricants as torque reducers in an 11 pounds per gallon (ppg) water-based mud. The two commercial lubricants used in the examples were HDL PLUS lubricant (HDL+) and Bio Add 378A lubricant (Bio Add) supplied by National Oil Well at Varco laboratories. HDL+ is a lubricant composed of diesel oil, kerosene and alcohols, whereas the Bio Add 378A is a composite of bio base (oil prepared by biological sources). RAS was also evaluated as a lubricant to compare the enhancement caused by a higher lipid concentration in EAS. Previous studies have shown that sludge can influence rheological properties like plastic viscosity, stress required to start the flow of drilling mud after certain period of static conditions (yield point), gel strengths, fluid loss properties along with lubricity (Dillon et al., 2014) (Parker, 1966). The Impact of EAS on all these properties was examined and compared with the commercial lubricants and RAS.

Sludge brought from the return activated sludge stream of east wastewater treatment facility in Lafayette, La., was used for the fermentation experiments. The samples were collected in one-gallon glass bottles and transported to the bioprocessing laboratory within a short time located in University of Louisiana at Lafayette. Sewage water from the facility was removed by centrifuging the samples in 50 ml corning tubes at 3000 rpm and was replaced with synthetic media having 70:1 carbon:nitrogen mole ratio, described in Table 1. Glucose was used as carbon source loading at 40 g/L, and ammonium sulphate for nitrogen. The media was inoculated to 25% v/v of activated sludge and transferred to the fermenter. Other sources of carbon and nutrients, including but not limited to materials found in industrial or sanitary wastewater or fresh or spent chemicals, may be used to produce RAS and EAS. Methods of wastewater treatment that produce acceptable biomass for conversion to a drilling mud additive include but are not limited to aerated bioreactors, trickling filters, rotating batch reactors, sequence batch reactors, moving bed reactors, lagoons. Acceptable biomass can be produced anaerobically or aerobically.

Fermentation took place in bioreactors maintained at 25+0.1° C., and pH at 6 for 7 days by automatic addition of 5N NaOH and 2N $H_2SO_4$. Air was purged in to the reactor vessel at 1 vvm (1 volume of air per volume of reactor) and stirring at 300 rpm. Samples were collected in coring tubes to determine the cell dry mass and lipid content. Water-based mud with bentonite and barite was chosen as our base drilling mud. The amount of bentonite and barite used per 350 ml of distilled water was 25 gm and 145 gm to reach 11 ppg density. After 7th day of fermentation, the enhanced activated sludge was separated from inoculate by replacing with distilled water, and concentrated (i.e., removal of at least the free water) to desired levels for mud preparation by centrifugation. When developed as a commercial product, further water removal may be desirable for storage and transportation reasons. These dewatering methods include, but are not limited to belt and filter or plate and frame presses, centrifuges, and dryers (although drying conditions must not denature the lipids in the EAS). Then bentonite was mixed for 30 minutes followed by barite for another 30 minutes. Test results characterizing the base mud, prior to additive addition is provided in Table 3. For the RAS examples, sewage water was replaced with distilled water. Lubricants were mixed at 2, 3.5, 5, and 7 gm per 350 ml of water used to prepare base mud, resulting in 1.78, 3.11, 4.43 and 6.17 pounds per barrel (ppb) of mud. Test results characterizing the base mud after the addition of sludge and commercial lubricants is provided in Table 4-11. Commercial lubricants were mixed after the base mud was prepared. Salt water, sodium hydroxide, carboymethyl cellulose, starch, and other components usually present in the commercial drilling fluid were not used in these examples to eliminate the number of variables effecting the performance of sludge in mud. Mud properties were measured within 24 hrs after mud preparation.

The cell biomass concentration was determined gravimetrically as the dry mass per volume of the culture. Samples from fermentation broth collected in a pre-weighed 50 ml corning tubes were centrifuged at 3600 rpm for 20 minutes using a Sorvall® ST 40 centrifuge. Cell pellets were washed twice with 25 g/L NaCl solution and frozen at $-20°$ C. Then samples were freeze-dried at $-80°$ C. for at least 24 hours. Dry cell mass was determined with the difference between mass of tubes after freeze dried and mass of tubes before sampling. The freeze-dried samples (dried cell mass) were transferred to extraction cells and powdered smoothly. The lipid content was determined using a Soxhlet extraction method. Chloroform and methanol were used as solvents. The solvents, with lipid collected, were transferred into pre-weighted vials. Solvents were evaporated by purging nitrogen gas at $60°$ C. temperature. The lipid yield was obtained by the difference in weights of vials before and after the solvent extraction. A lubricity meter was used to evaluate the lubricity values of mud samples using test procedures designed by American Petroleum Institute practice 13B. Torque of 150 pounds was applied on the test block rotating at 60 rpm. After 5 minutes the torque reading showed by the lubricity meter was recorded. A calibration constant for the equipment was used to calculate the coefficient of friction (COF) and torque reduction. COF was used to compare the lubricity performance of samples.

Plastic viscosity and yield point were measured using a viscometer. API fluid loss and HPHT High temperature and high pressure fluid loss (HPHT fluid loss) were measured to analyze the effects of EAS compared to mud without additive and commercial lubricants. API fluid loss was measured at $25°$ C. and 100 psi pressure. The HPHT fluid loss conditions were 500 psi pressure and $250°$ F. temperature. API 13B practice procedures for measuring water-based mud properties were followed to measure alkalinity, chloride content and methylene blue tests to assess the contamination of mud by enhanced sludge (EAS) and other lubricants.

Enhancement of activated sludge experiments resulted in a 19.55 g/l dry mass over 7 days of culturing with an average of 19.46% CDW extractable lipid content. Two commercial lubricants, HDL+ and Bio Add 378, were tested individually in base mud to compare with the performance EAS and RAS. To improve accuracy, at least 3 replicates were performed for each additive performance analysis in base mud.

Results of lubricity tests as friction coefficients are shown in FIG. 1. The highest performance was observed for Bio Add and then followed by HDL+. EAS and RAS reduced the friction upon addition compared to mud without additive. EAS resulted in better lubrication properties at any concentration, which demonstrates the impact of lipid content over friction reduction. EAS had an average of 19.46% CDW of extractable lipids, which is higher than RAS (5-10% lipids). In addition to lipids, the total impact of microorganism on lubricity includes the effect of cellular material (e.g., phospholipids, glyco proteins, amino acids), which could differentiate more the lubricity performance between RAS and EAS. RAS is a more heterogeneous microbial community whereas 80% of EAS are oleaginous microbes. The heterogeneity of the microbial community may also impact the energy required for lysis of the cell wall and release of the lipids into the aqueous phase.

Figure 2:
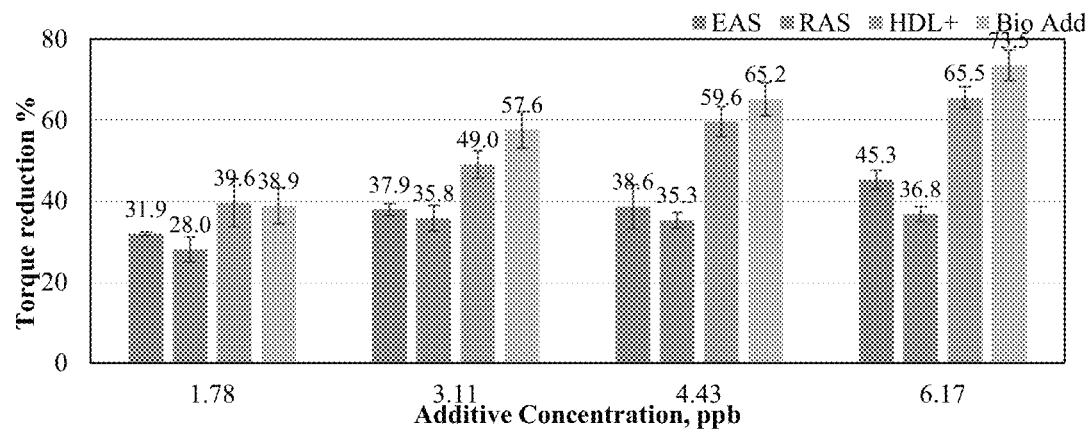
FIG. 2 provides a comparison of the relationship between additive concentration and the resultant torque reduction.

Torque reduction percentages of lubricants tested are shown in FIG. 2. Increasing the sludge concentration has a positive effect on torque reduction but far less than commercial lubricants. Commercial lubricants were able to reduce the torque by around 70% whereas the maximum torque reduced by EAS was 45% compared to mud without lubricant. In contrast to EAS and RAS, commercial lubricants are chemicals derived from crude oil. EAS and RAS are mixed consortium of microorganisms derived by products of wastewater treatment facilities. The difference between the EAS and RAS was not observed to increase consistently with increasing concentration in mud because of the variation of lipid content in RAS along with heterogeneity of the microbial community. Previous researchers have demonstrated a reduction in microbial diversity of EAS, and the increase in the concentration of neutral lipids (triglycerides) (Dillon et al., 2014). However, EAS at 6.17 ppb performs better than HDL+ at 1.78 ppb and Bio Add at 1.78 ppb. Additionally, EAS at 4.43 ppb was similar to Bio Add at 1.78 ppb. This indicates that sludge can perform similar to commercial lubricants at higher concentrations.

Table 2 shows that the mud densities of EAS mixed mud and RAS mixed mud are nearly equal. Sludge (both EAS and RAS) does not affect the mud density significantly, most likely because sludge is approximately 90% is moisture. Base mud, which is mud without additives was mixed to 11 ppg density. Foam due to oil/water emulsion formed by commercial lubricants, both HDL+ and Bio Add, was responsible for the decreased mud weights shown in Table 2. These results indicate that addition of commercial lubricants need to be added in connection with a defoamer to prevent foam generation. This is not the case with EAS.

Figure 3:
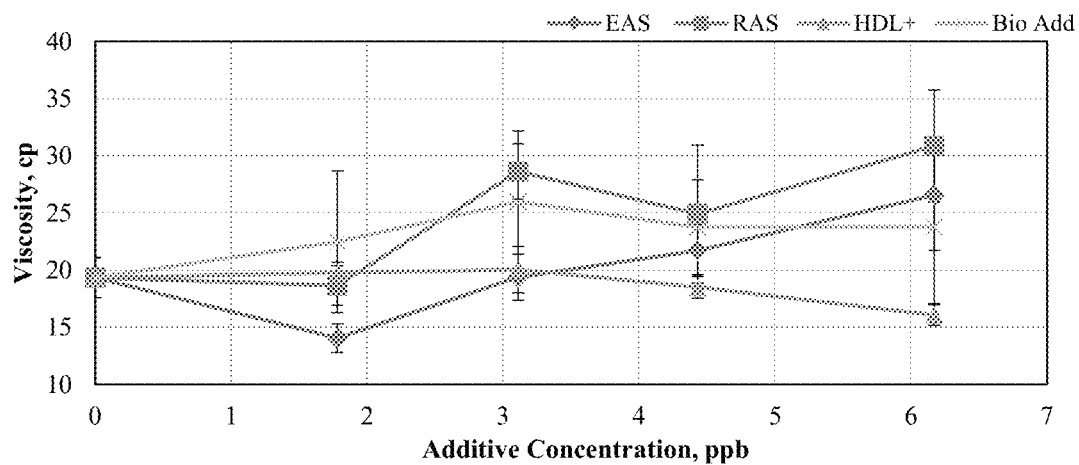
FIG. 3 provides a comparison of the relationship between additive concentration and the resultant viscosity.

FIG. 3 shows the Plastic Viscosity (PV) of mud with different lubricants. Increasing HDL+ and Bio Add concentration is expected to raise PV because of the consequent increase in oil content. An increase in drilling fluid viscosity can result in an increase in cutting transport performance provided the flow regime remains turbulent. (Piroozian, Ismail, Yaacob, Babakhani, Ismail 2012). Both commercial lubricants resulted in higher plastic viscosity compared to sludge (both EAS and RAS) at the lowest tested concentration. However, once the concentration of HDL+ and Bio Add reaches 3.37 ppb, plastic viscosity started to decrease with concentration. This phenomenon was also caused by foam formation. The PV of EAS and RAS were gradually increased with concentration. Lipid concentration of EAS was responsible for the raise in PV was a function of concertation. FIG. 3 also shows RAS mud has highest PV of all the lubricants at relatively high concentrations. Microbial composition, lipid content, and sand particles could have caused RAS to higher resistance to flow compared to EAS. Once waste activated sludge is transformed to EAS, the chemical and physical properties of the microbial mixture are homogenous than RAS, and there is almost no content of sand particles.

Figure 4:
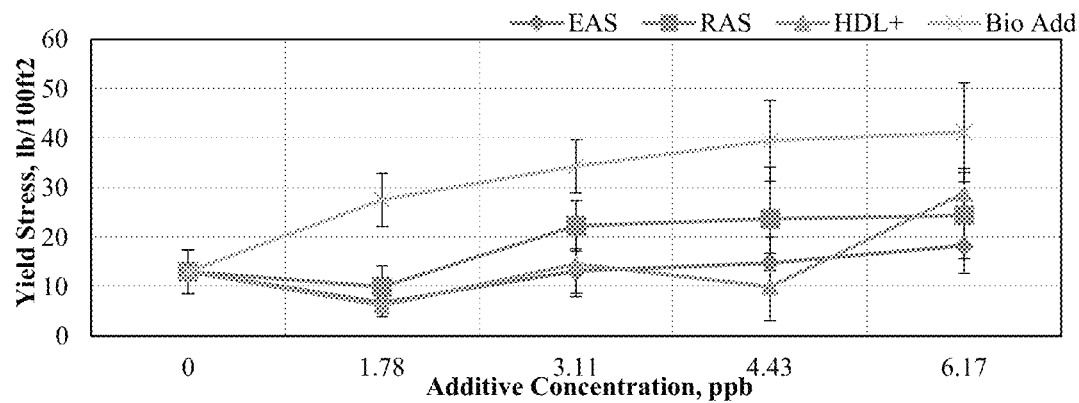
FIG. 4 provides a comparison of the relationship between additive concentration and the resultant yield stress.

Yield point analyses results are displayed in FIG. 4. It can be observed that yield point behavior of lubricants in mud was similar to the plastic viscosity behavior. "Yield Point is used to evaluate the ability of a mud to lift cuttings out of the annulus. A high yield point implies a non-Newtonian fluid, one that carries cuttings better than a fluid of similar density but lower yield point." (Schlumberger Oilfield Glossary). As mentioned above the heterogeneity, type of lipids, sand particles and lipid variation were responsible for the higher YP of RAS compared to EAS. The heterogeneity is the cause of the large error bars observed the YP values for RAS. Yield point of EAS was increased as glycerides (neutral lipids) increased with concentrations compared to mud without additive. Foam was the larger source of error for measuring rheological properties with the commercial lubricants. The ethylene glycol present in Bio Add mixture could be another reason for the highest YP values compared to other lubricants, because this alcohol reduce the solubility of barite in the mud (Kan, Fu, & Tomson, 2003).

Figure 5:
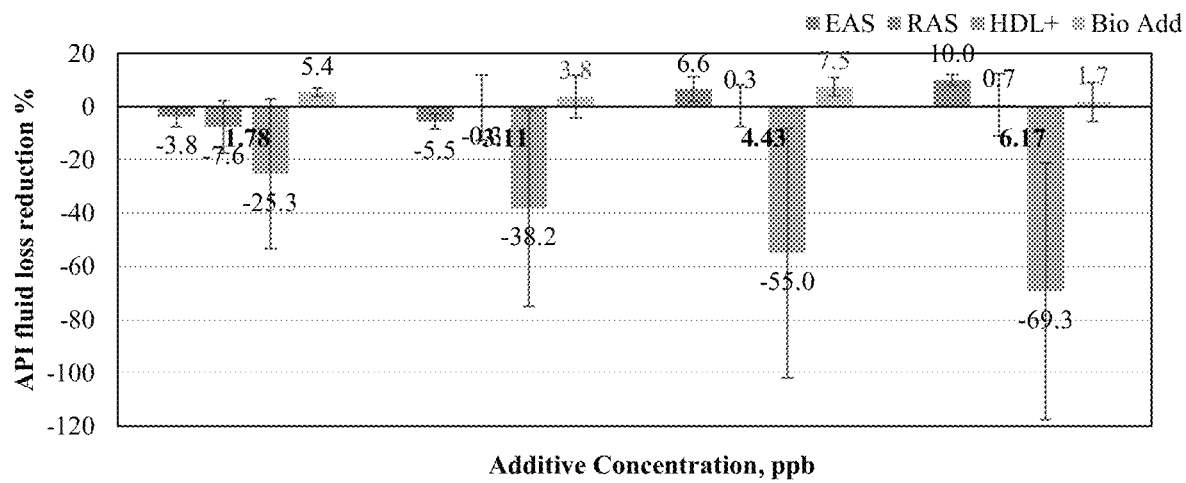
FIG. 5 provides a comparison of the relationship between additive concentration and the resultant API fluid loss reduction.

API fluid loss experiments were conducted at 100 psi and 25° C. for 30 minutes. Results are shown in FIG. 5. As expected, activated sludge has a positive impact on fluid loss reduction at high concentrations. The biosoilds or the cellular particles seal the permeability of the mud cake formed, resulting in low fluid loss when compared to mud without lubricant. At low concentrations, the microbes (in both RAS and EAS) suspension was suppressed by heavy barite (around 35 ppg). At relatively at high concentrations, EAS was able to reduce the API fluid loss up to 10% at 6.17 ppb.

Figure 6:
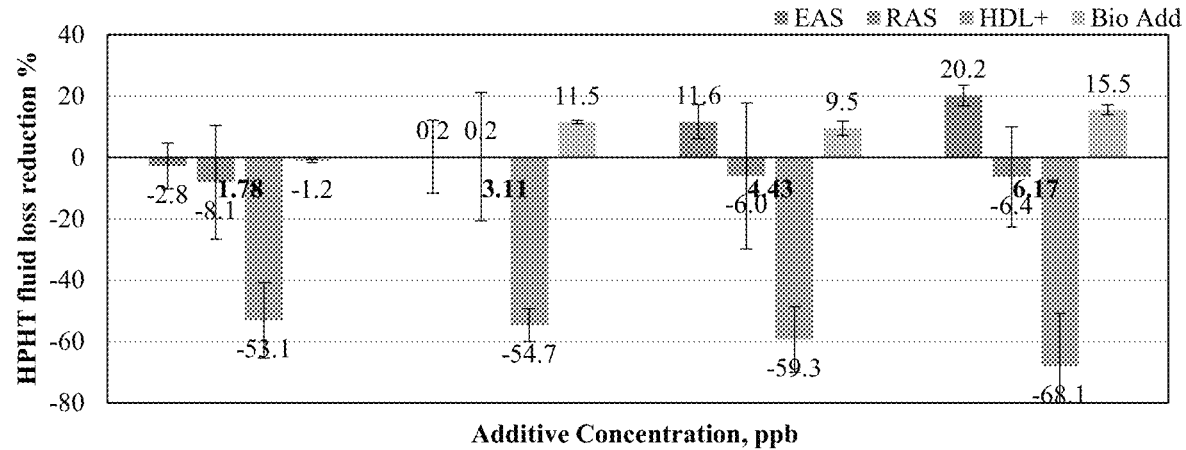
FIG. 6 provides a comparison of the relationship between additive concentration and the resultant HPHT fluid loss reduction.

Fluid loss of mud with additives at high temperature (250° F.) and high pressure (500 psi) were measured for 30 minutes. Results are shown in FIG. 6. Similar behavior of EAS and RAS in API fluid loss was observed in the HPHT fluid loss. As their concentrations increase in the mud the number of microbes in the mud settling on the cake increase and reduce the permeability, thereby reducing the fluid loss. EAS was able to reduce the HPHT fluid loss upto 20% at 6.17 ppb. The different settling characteristics of more heterogeneous species in RAS and the presence of sand could explain the different behavior of thus mud compared to EAS.

HDL+ in mud resulted in higher fluid loss most likely caused by foam formation as a function of concentration. Even with the foam formation, Bio Add showed low fluid loss compared to the base mud. However, EAS was superior reducing fluid loss compared to Bio Add at relatively high concentrations. Fluid loss reduction was not expected from commercial lubricants because they are prepared with the only objective of friction reduction and not fluid loss reduction. Mud cake formed with EAS and RAS was thicker than base mud and commercial lubricants, which explains the fluid loss reduction performance of EAS.

API practice 13B manual says solids bigger than 74 micrometer should be considered as sand content. As shown in FIG. 7, the free settling of sludge over the settled sand of barite and bentonite resulted in sticking on the walls of the sand content glass tube. This resulted in the increased sand content percentages for EAS and RAS presented in FIG. 8. Dilution caused by the foam formation of HDL+ and Bio Add resulted in inconsistent numbers for the testing of these commercial lubricants with increase in concentration. As mentioned above, Bio Add (ethylene glycol) reduced the solubility of barite significantly at high concentrations (Kan et al., 2003), resulting in sand content of more than 5%.

In the alkalinity tests performed on mud samples having EAS, RAS and commercial lubricants, none of the mixtures have a significant change with the addition of lubricants and increasing concentrations when compared to base mud. EAS and RAS could affect the alkalinity and pH of mud due the microbial metabolic activity. The environment in the mud, having no oxygen supply, and carbon source for food is not supportive for EAS growth. Additionally, chemical analysis was performed after 24 hrs. of mud mixing.

The chloride content test and methylene blue test for base mud averaged to 120+20 ppm and 0.07+0.02 meq, respectively. EAS and RAS does not show any difference when compared to base mud at all tested concentrations.

As disclosed herein, addition of EAS to drilling muds enhances lubricity in water-based muds. Two different types of commercial lubricants were also tested for lubricity to compare with EAS performance. Some drilling muds mixtures that incorporated EAS demonstrated similar results compared to drilling muds that incorporated commercial lubricants.

In conclusion, both RAS and EAS, when used as an ingredient in drilling mud, have been demonstrated to have a beneficial impact on several critical drilling mud quality criteria without having a significantly negative impact on the density of the drilling mud. Both RAS and EAS, when added to drilling mud decreased the coefficient of friction (i.e., lubricity), reduce torque, increase viscosity and to a lesser extent, yield stress. EAS, at higher concentrations resulted in significant fluid loss reduction. Accordingly, both EAS and RAS could eliminate use of costly and potentially environmentally harmful commercial lubricants, or in the alternate, could be used in conjunction with these chemical lubricants, resulting in less use of the commercial lubricants.

We claim:

1. A composition of drilling mud comprising:
   (a) A fluid;
   (b) Weighting materials to obtain a density greater than the fluid; and
   (c) Activated sludge, wherein the activated sludge is fermented under stress conditions to produce an enhanced activated sludge with an increased lipid content, wherein said stress conditions include an environment relatively high in carbon to nitrogen.

2. The composition of claim 1 wherein the enhanced activated sludge has a lipid content of greater than five percent dry weight.

3. The composition of claim 2 wherein said drilling mud contains greater than 1 pound per barrel of enhanced activated sludge.

4. The composition of claim 2 wherein said drilling mud contains greater than 3 pound per barrel of enhanced activated sludge.

5. The composition of claim 2 wherein said drilling mud contains greater than 5 pound per barrel of enhanced activated sludge.

6. The composition of claim 1 wherein the enhanced activated sludge has a lipid content of greater than ten percent dry weight.

7. The composition of claim 1 wherein the enhanced activated sludge has a lipid content of greater than fifteen percent dry weight.

\* \* \* \* \*